(12) United States Patent
Gamage et al.

(10) Patent No.: US 9,602,513 B2
(45) Date of Patent: Mar. 21, 2017

(54) ACCESS CONTROL OF EDGES IN GRAPH INDEX APPLICATIONS

(71) Applicant: MICROSOFT TECHNOLOGY LICENSING, LLC, Redmond, WA (US)

(72) Inventors: Roshan Gamage, Tromso (NO); Bjornstein Lilleby, Tromso (NO); Azmil Macksood, Oslo (NO); Øivind Wang, Oslo (NO); Bård Kvalheim, Oslo (NO); Håkon Brugård, Tromso (NO); Rune Devik, Tromso (NO); Torbjørn Helvik, Oslo (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/474,421

(22) Filed: Sep. 2, 2014

(65) Prior Publication Data

US 2015/0249669 A1    Sep. 3, 2015

Related U.S. Application Data

(60) Provisional application No. 61/946,347, filed on Feb. 28, 2014.

(51) Int. Cl.
*G06F 21/00* (2013.01)
*H04L 29/06* (2006.01)
*G06F 17/30* (2006.01)

(52) U.S. Cl.
CPC ........ *H04L 63/10* (2013.01); *G06F 17/30091* (2013.01)

(58) Field of Classification Search
CPC ........................... H04L 63/10; G06F 17/30091
See application file for complete search history.

(56) References Cited

U.S. PATENT DOCUMENTS

| 8,250,048 | B2 | 8/2012 | Yalamanchi et al. | |
| 8,842,818 | B2* | 9/2014 | Alperin | H04L 63/30 379/265.06 |
| 2008/0016115 | A1* | 1/2008 | Bahl | H04L 41/22 |
| 2011/0078188 | A1* | 3/2011 | Li | G06Q 30/02 707/776 |
| 2012/0221556 | A1* | 8/2012 | Byrne | G06F 17/30979 707/723 |

(Continued)

OTHER PUBLICATIONS

Neo4j "Access Control Lists the Graph Database Way", Feb. 25, 2010, retrieved Dec. 2, 2015 from http://neo4j.com/blog/access-control-lists-the-graph-database-way/ pp. 1-13.*

(Continued)

*Primary Examiner* — Lisa Lewis

(57) ABSTRACT

A computer-implemented method that monitors the activity of different nodes within a system as well as crowd sourcing activity. The computer-implemented method determines that a first node formed a relationship with a second node, generates an edge based on the relationship between the first node and the second node, stores the edge in a graph index and assigns a privacy setting to the edge based on the relationship between the first and second nodes.

20 Claims, 13 Drawing Sheets

(56) References Cited

U.S. PATENT DOCUMENTS

| | | | | |
|---|---|---|---|---|
| 2014/0009472 A1* | 1/2014 | Ajitomi | ............ | G06F 17/30958 345/440 |
| 2014/0280044 A1* | 9/2014 | Huynh | ............. | G06F 17/30477 707/722 |
| 2015/0199734 A1* | 7/2015 | Abuelsaad | ......... | G06Q 30/0283 705/400 |
| 2015/0280999 A1* | 10/2015 | Chart | ...................... | H04L 41/12 709/224 |

OTHER PUBLICATIONS

Zheleva, et al., "Preserving the Privacy of Sensitive Relationships in Graph Data", In Proceedings of the 1st ACM SIGKDD International Conference on Privacy, Security, and Trust in KDD, Aug. 12, 2007, 20 pages.

Sala, et al., "Sharing Graphs using Differentially Private Graph Models", In Proceedings of the Conference on Internet Measurement Conference, Nov. 2, 2011, 14 pages.

Rodríguez-Velazquez, et al., "On Reliability Indices of Communication Networks", In Computers and Mathematics with Applications, vol. 58, Issue 7, Oct. 2009, 8 pages.

Nawroth, Anders, "Access Control Lists the Graph Database Way", Published on: Feb. 25, 2010, Available at: http://blog.neo4j.org/2010/02/access-control-lists-graph-database-way.html.

Cao, et al., "Privacy-Preserving Query over Encrypted Graph-Structured Data in Cloud Computing", In International Conference on Distributed Computing Systems, Jun. 20, 2011, 10 pages.

Bronson, et al., "TAO: Facebook's Distributed Data Store for the Social Graph", In Proceedings of Usenix Annual Technical Conference, Jun. 26, 2013, 12 pages.

Davidson, et al., "Enabling Privacy in Provenance-Aware Workflow Systems", In Proceedings of Fifth Biennial Conference on Innovative Data Systems Research, Jan. 9, 2011, 4 pages.

Nawroth, Anders, "Access Control Lists the Graph Database Way", Published on: Feb. 25, 2010, Available at: http://blog.neo4j.org/2010/02/access-control-lists-graph-database-way.html, 5 pages.

* cited by examiner

400

```
RECEIVE INFORMATION THAT A FIRST NODE IS FORMING A
RELATIONSHIP WITH A SECOND NODE
410
            │
            ▼
IDENTIFY THE RELATIONSHIP BETWEEN THE FIRST NODE AND
SECOND NODE
420
            │
            ▼
DETERMINE THE PRIVACY SETTING FOR THE RELATIONSHIP
BETWEEN FIRST AND SECOND NODE
430
            │
            ▼
STORE, IN THE GRAPH INDEX, IDENTITY INFORMATION OF THE
FIRST AND SECOND NODES, THE RELATIONSHIP
THEREBETWEEN, AND THE PRIVACY SETTING ASSOCIATED WITH
THE EDGE
440
```

DETERMINE THAT MORE THAN A THRESHOLD AMOUNT OF NODES IN A SET OF NODES ASSOCIATED WITH A FIRST NODE HAVE FORMED RELATIONSHIPS WITH A SECOND NODE
*610*

DETERMINE THE RELATIONSHIP BETWEEN THE FIRST NODE AND THE SECOND NODE
*620*

STORE IN THE GRAPH INDEX INFORMATION INCLUDING: THE IDENTITY OF THE FIRST NODE, THE IDENTITY OF THE SECOND NODE, AND THE RELATIONSHIP BETWEEN THE FIRST NODE AND THE SECOND NODE
*630*

*FIG. 6*

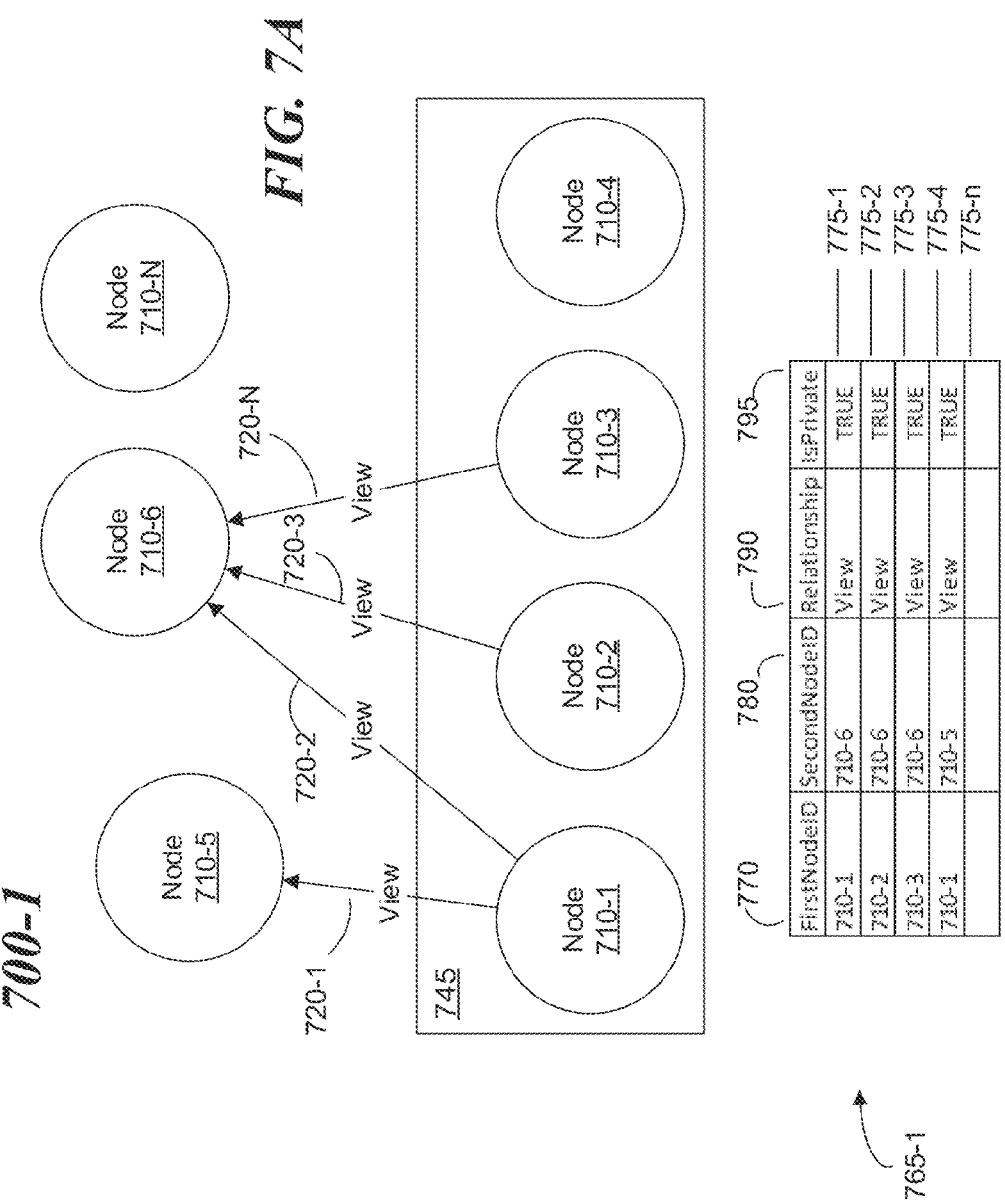

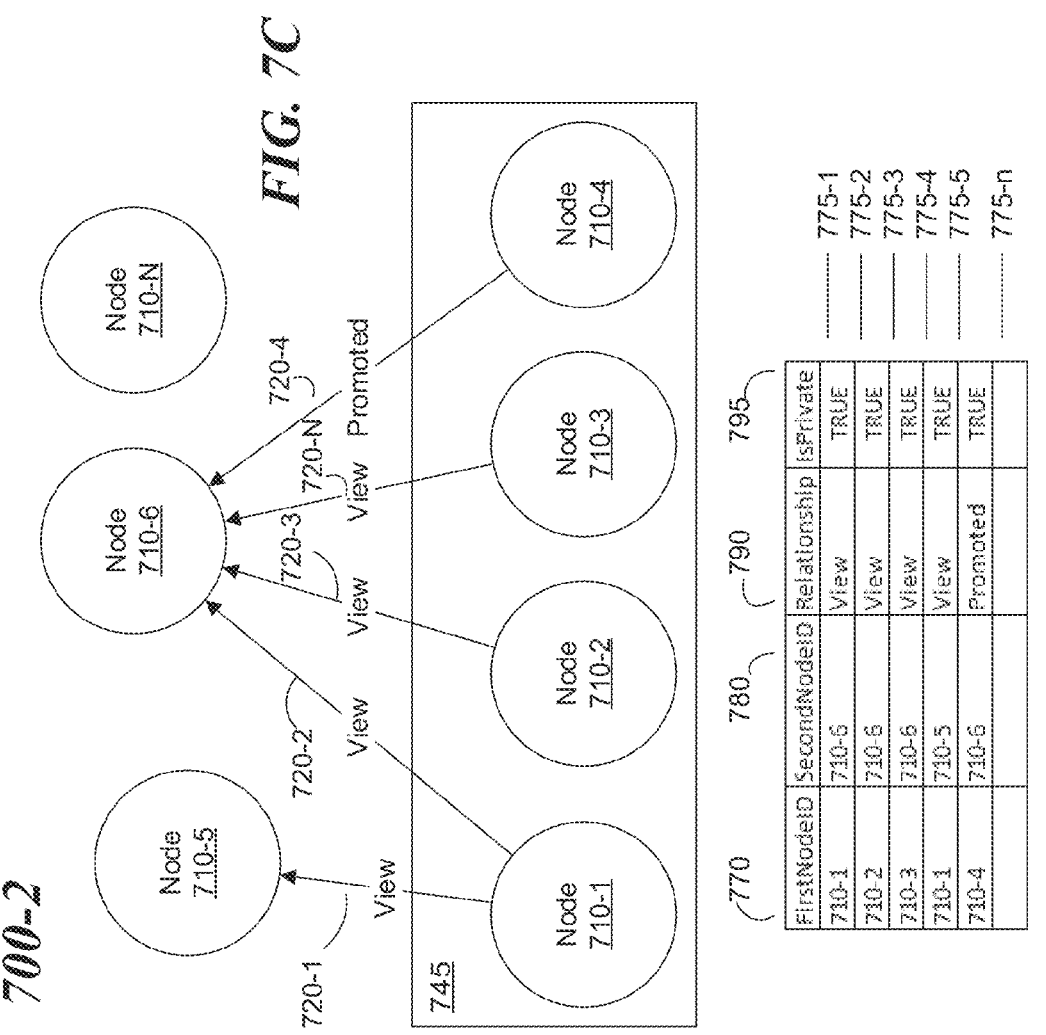

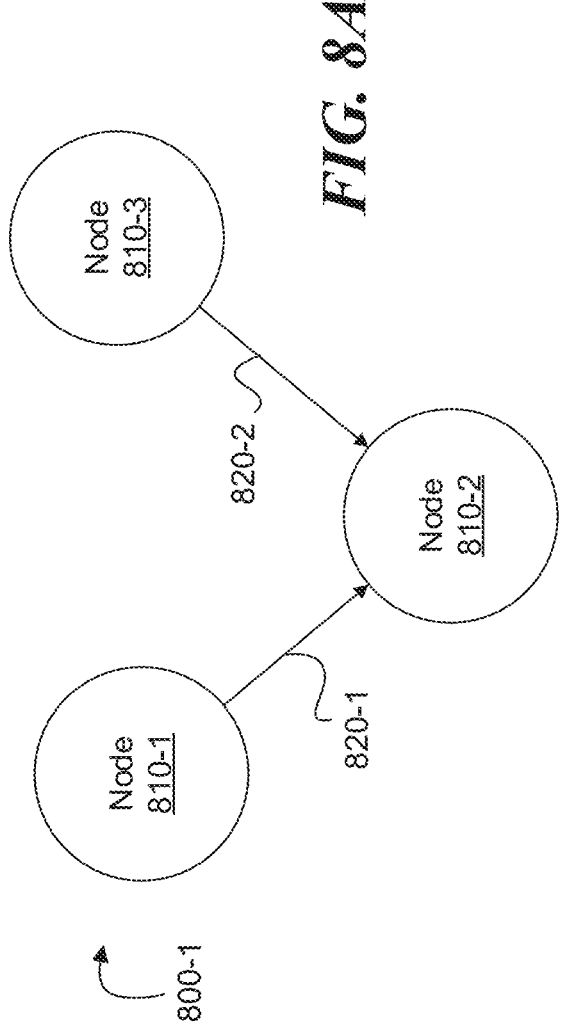

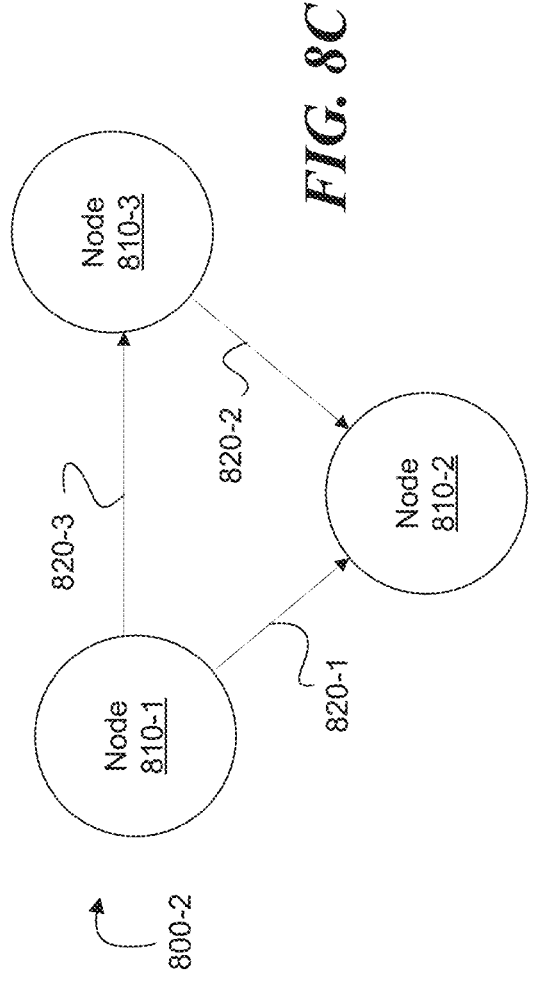

ACCESS CONTROL OF EDGES IN GRAPH INDEX APPLICATIONS

BACKGROUND

In a computer system, files are typically organized and displayed to a user by showing directories on the user's local storage. Examples of such systems include those running, for example, MICROSOFT® WINDOWS®. To facilitate teamwork over a network or over the Internet, users may store, share and manage files via cloud-based content management systems such as, for example, MICROSOFT® ONEDRIVE™. Such systems make it significantly easier for a user to access this shared content from across a network or the Internet. A user in such an environment has access to a tremendous amount of content, so the user needs to be able to distinguish content relevant to his or her workflow. This may be difficult because relevant content is often scattered across multiple users and stored in multiple places. One potential solution is for a system to use an enterprise graph, such as, for example MICROSOFT® OFFICE 365™ or MICROSOFT® YAMMER®. Using an enterprise graph may allow a user to find relevant content in a quicker, more informed, and efficient manner, but may introduce privacy concerns.

One way to provide information about content and activities within an enterprise is the use of enterprise graphing. In particular, user actions within an enterprise may be stored in various relational data bases (db), log files, etc., and enterprise graphing analyzes these data and interactions to provide the aggregated sum of activity and facts among the enterprise users. In other words, enterprise graphing is an analytical tool to capture and illustrate enterprise data and activity.

An enterprise graph illustrates entities, called "nodes," and relationships between those entities, called "edges." More particularly, enterprise graphs illustrate a variety of nodes such as, for example, users, documents, presentations, meetings, emails, etc., and edges define the relationships between those nodes such as authoring, editing, viewing, sharing, sending, etc. In certain circumstances, enterprise graph queries associated with a particular user may return information that is considered private. For example, enterprises may want to restrict access to certain content among its users. Thus, when graph queries are run, the right content must be associated with the right users otherwise private information may be disclosed. However, in order to provide accurate graph data, which may be public, to illustrate the aggregated sum of activity within an enterprise, private data must be considered while ensuring that the privacy of that data is not made public. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to ensure that information provided in connection with an enterprise graph query produce accurate results of the behavior of enterprise users while maintaining the privacy of this data. The edges of an enterprise graph that may be private must be taken into account in order to provide an accurate depiction of the activity of an enterprise in response to a query, the results of which may be public, without releasing the original private information. A graph index stores relationships as edges between actors and various nodes with a Boolean value indicating whether or not the edge is private. In alternative embodiments a more sophisticated data structure may be used instead of a Boolean value such as, for example, an integer value or a table showing that the edge should only be visible to a certain set of nodes. When the data within an enterprise is indexed, a Boolean value is set that is associated with an edge based on the relationship that the edge represents with the actor. When a query or request for a graph index is run, the identification (ID) of the user of the actor requesting the query is used to filter out the edges where the privacy value indicates whether the edge is private.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates an embodiment of a logic flow for forming a new edge in an enterprise graph.

FIG. 6 illustrates an embodiment of a logic flow for generating a new edge for an enterprise graph by means of crowdsourcing.

FIG. 7A illustrates an exemplary enterprise graph.
FIG. 7B illustrates an exemplary node table.
FIG. 7C illustrates an exemplary enterprise graph.
FIG. 7D illustrates an exemplary node table.
FIG. 8A illustrates an exemplary enterprise graph.
FIG. 8B illustrates an exemplary node table.
FIG. 8C illustrates an exemplary enterprise graph.
FIG. 8D illustrates an exemplary node table.

DETAILED DESCRIPTION

Figure 1:
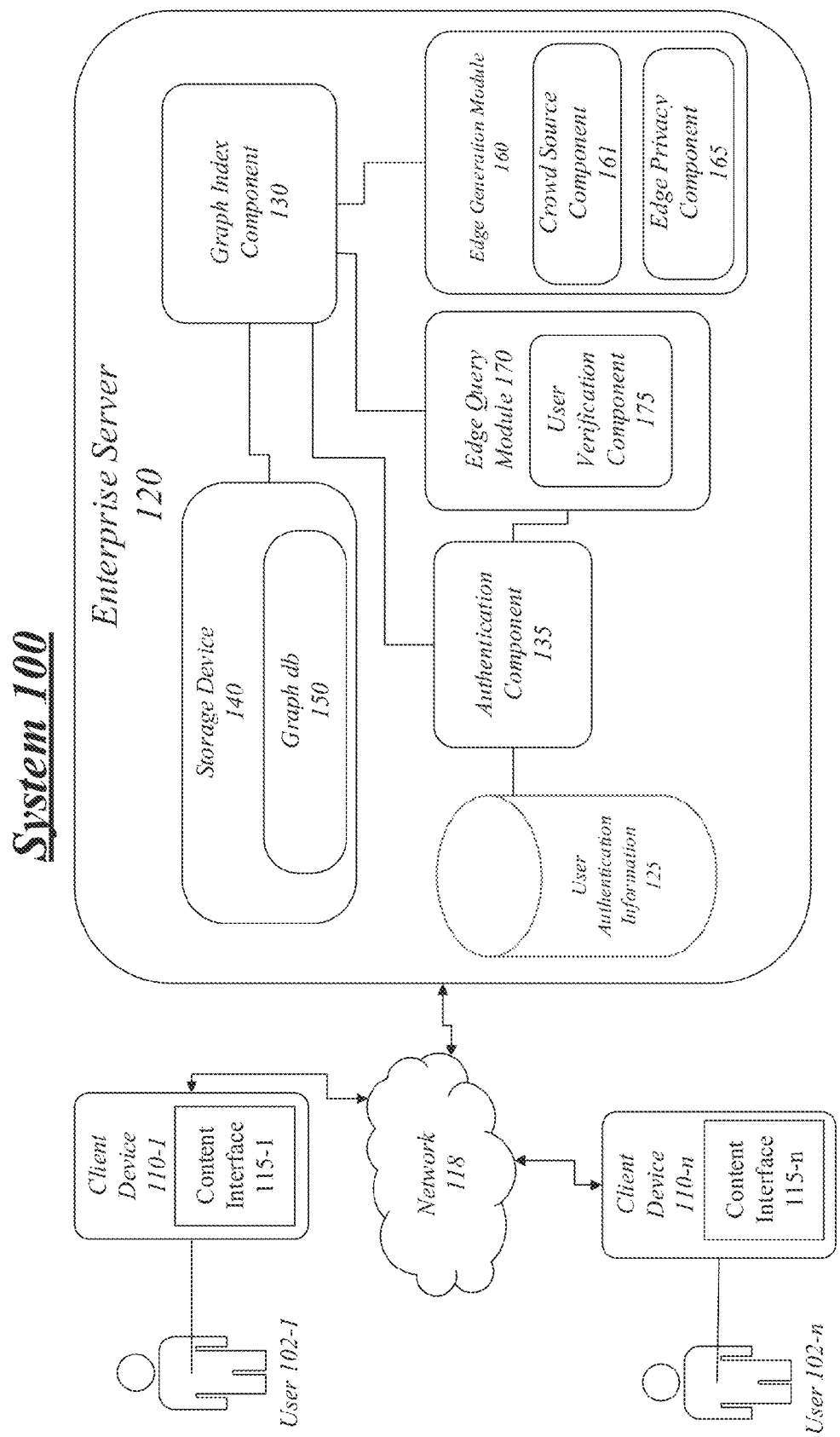
FIG. 1 illustrates an embodiment of an enterprise graphing system.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for a specific purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the needed method steps. The needed structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may include an enterprise server 120 and one or more client devices, such as client devices 110-1 . . . 110-$n$ associated with registered users 102-1 . . . 102-$n$. The client devices 110-1 . . . 110-$n$ may communicate with the enterprise server 120 via a wired connection and/or via network 118. Although the system 100 shown in FIG. 1 has a limited number of elements in a certain topology, it may be appreciated that the system 100 may include more or less elements in alternate topologies as desired for a given implementation. Each of the client devices 110-1 . . . 110-$n$ has a corresponding content interface 115-1 . . . 115-$n$ that communicates with enterprise server 120 to send and receive activity data associated with a user 102-1 . . . 102-$n$ as well as manage various graph queries from the respective users. The term user may be referred to herein as "actor" depending on whether the user is requesting a graph query as described below. Of course, the term "actor" is not limited to users, but rather may include any entity which performs an action on the system, including applications, peripheral devices, etc. A client device, such as client device 110-1, may be used to access various data such as creating, editing, viewing documents and files, viewing various web pages, sending emails, etc. In other words, a user in an enterprise setting may interact with many different services such as, for example, document and file management services, email applications, instant messaging services, telecommunication applications, etc. Each of the content interfaces 115-1 . . . 115-$n$ may be a software application comprising instructions that, when executed by a corresponding client device 110-1 . . . 110-$n$, provide a means for recording or sending the activity of a user within an enterprise for each of these various user activities to enterprise server 120. When a user 102-$n$ performs an activity, that activity information is stored in graph database (db) 150 of enterprise server 120 via corresponding content interface 115-$n$ as described in more detail below.

Enterprise server 120 may represent one or more electronic devices that provide and host enterprise applications for multiple clients devices 110-1 . . . 110-$n$ and corresponding users 102-1 . . . 102-$n$. Enterprise server 120 may be implemented as one or more on-premises electronic devices, for example, for a particular business, entity, etc. Enterprise server 120 may also be implemented as a remote or "cloud" deployment accessible over a network, such as the Internet. Enterprise server 120 may be arranged to provide various services such as, but not limited to, enterprise graph generation, monitoring, and recording.

Each content interface 115-1 . . . 115-$n$ is configured to collect usage information according to user events and provide this information to graph db 150 via graph index component 130. In particular, an exemplary content interface 115-$n$ monitors and collects occurrences of usage events by a user 102-$n$. The usage events may be configured through an Application Programming Interface (API) and or various user interfaces (UI's). For example, an event may occur when a user 102-$n$ views a document or file. An event may occur, for example, when a user 102-$n$ modified a document or file. Each of these events is monitored by content interface 115-1 and relevant information from the event is provided to graph db 150 of enterprise server 120. The relevant information may include, for example, the ID of user 102-$n$, the document or file name and path, the date and time the document or file was viewed by user 102-$n$, etc. Generally, the user 102-$n$ may have a corresponding first node associated therewith. This node may include information unique to user 102-$n$, such as the user's email address, login information, photograph, etc. It is important to note that the user's corresponding node may take many forms without detracting from the spirit of this invention, for example a single node may be shared by multiple users in a department, or a single user might have several nodes associated with the user such as, for example, a user may have one node used in communication with those outside an organization and a separate node used in communication with those inside the organization. For shorthand, a user may sometimes be referred to herein as a node, or vice-versa, but in fact this refers to situations where a particular node is associated with a user. In this example, the document or file that is accessed by the user is referred to as a second node. The act of viewing, modifying, etc., the document is the relationship between the nodes, and the edge is defined by the relationship between the nodes, namely that the first node viewed, modified, etc., the second node. It is important to note that this second node may also take multiple forms without detracting from the spirit of the invention. For example, the second node may be the document itself, or a data structure containing information unique to the document, such as a filepath, URL, network address, metadata, version control value, etc. For shorthand, a document or other piece of content may be referred to as a node, and this is intended to include situations where the node is the document or other content as well as situations where the node represents the document or content. A single node may comprise other nodes, for example a situation where a presentation (such as those made with MICROSOFT® POWERPOINT®) includes a chart (such as those made with MICROSOFT® EXCEL®) or a video (such as those made with MICROSOFT® MOVIE MAKER™). Sometimes variations on the term "viewing" are used to describe the action that one node takes upon another node, and this term typically connotes a human being looking at something, but in this case it is used as a general shorthand for any form of accessing or reading data from a source. For example, a spreadsheet node may cull data from a database node, and this may be considered "viewing" even if there is no human involvement.

In an exemplary embodiment, enterprise server 120 may include various functional components, such as a storage device 140, a graph index component 130, an authentication component 135, a user authentication information store 125, an edge query module 170 and an edge generation module 160. Enterprise server 120 may include alternate, fewer or additional components to provide the functionality described herein. In various embodiments, some components may be combined into one component. The embodiments are not limited to these examples. Enterprise server 120 may receive activity information in storage device 140 via graph index component 130. In particular, information about various items within an enterprise, such as users, documents, meetings, conversations, files, etc., are monitored by respective content interfaces 115-1 . . . 115-n and provided to graph db 150 via storage device 140. The system 100 may be configurable to collect particular usage events within an enterprise. Graph db 150 may be a relational database, log file, etc. configured to store usage events by users 102-1 . . . 102-n in an enterprise. The graph db 150 is used to store relationships between nodes and edges with an associated Boolean value to indicate whether the edge itself is private or public. For example, if user 102-1 views a document or file, user 102-1 is considered node one, the document or file is considered node 2 and the relationship between the nodes is considered the edge. Whether or not an edge is private usually applies to edges going from a user, e.g. user 102-1 in this example. When the activity between nodes is stored in graph db 150, the private or public Boolean value is set depending on the relationship the edge represents. For example, when user 102-1 views a document or file, this activity is stored in the graph db 150 with the private or public Boolean value set with the generation of the edge. The Boolean value indicates whether the action (i.e. edge) the actor took is private or public.

Graph index component 130 is configured to receive a query from a user 102-1 . . . 102-n and process the query to obtain search results related to usage analytics associated with the requesting user. Graph index component 130 may be an application/process configured to run as a resource on enterprise server 120, such as for example, MICROSOFT® OFFICE 365™ or MICROSOFT® SHAREPOINT®. Graph index component 130 utilizes authentication component 135 to verify the information associated with the user requesting the query also referred to as an actor as previously noted. This ensures that the query returns the correct content based on the actor. In particular, authentication component 135 compares the information associated with the user requesting the query with the user authentication information store 125. For example, authentication component 135 may compare the user ID, password, etc. of the actor requesting the query with the information in user authentication information store 125.

The query generated by the edge query module 170 is executed on the graph db 150 via graph index component 130. The user verification component 175 is accessed by edge query module 170 to ensure that all the nodes and edges associated with the user requesting the query are included and those edges that are marked private and not associated with the user requesting the query are excluded. This verification process run by user verification component 175 determines which edges are excluded from the query based on the privacy status of a particular edge. Once the verification component 175 verifies the user information, the user requesting the query is defined as node one and the query will exclude nodes and edges that are private to nodes other than node one. Based on the user information verified by user verification component 175, edge query module 170 generates a query of the graph db 150 via graph index component 130 to produce an enterprise graph associated with the user requesting the query. In other words, the query generated by edge query module 170 is formulated to exclude information from the graph that is set to be private where the user requesting the query is not identified as the first node. The query uses the user id to filter out all edges where the Boolean value for privacy is true and the first node is not equal to the ID of the user requesting the query.

Edge generation module 160 is configured to generate new edges for an enterprise graph. This includes generating new edges based on the concept of "crowd sourcing." Crowd sourcing refers to deriving insights based on existing connections in the enterprise graph. Crowd sourcing may provide insights about a particular node or set of nodes even if the node does not already have any existing edges. For example, if more than a threshold number of users in a particular set of users has a relationship with a node that is private, a new edge may be created for another actor within the set and the node. Edge generation module 160 includes crowd source component 161 and edge privacy component 165. The process of generating new edges for an enterprise graph associated with an actor may occur as a result of user action or may occur automatically, for example via crowd source component 161. In particular, whenever a user interacts with a document, another user, or other entity, the edge generation module may activate and undergo process 400 as described in more detail in FIG. 4. Crowd source component 161 may automatically activate and undergo process 600 described in FIG. 6 to form an edge between an actor within the set and a node. It is important to note that access privileges with nodes may not change as a result of the generation of an edge by edge generation module 160. For example, if users within a set have edges identified as private with a particular node, an edge may be created from another user within the set for that node, but if the new user does not have access to the node, then the generation of the edge does not change the access privileges. In other words, a generation of an edge by edge generation module 150 will not change the fact that a user does not have access to the node (e.g., document, file, etc.).

Whenever edge generation module 160 generates a new edge, edge privacy component 165 determines the privacy setting for the new edge. By way of example, edge privacy component 165 may make this determination based on user settings or organizational policies. For each edge, once edge generation module 160 is aware of the nodes, the relationship, and the privacy setting, it may formulate this data for indexing and send this data to the graph index component 130. However, edge generation module 160 may not disclose the specific users that contributed to exceeding the threshold in order to generate the edge. In this manner, a new edge may be generated and inserted into an enterprise graph based on the crowd sourcing concept.

Figure 2:
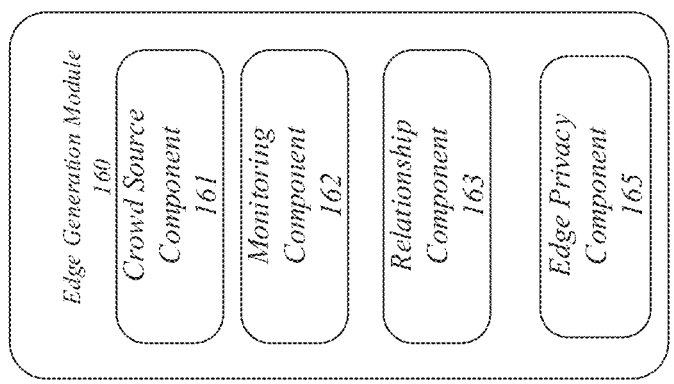
FIG. 2 illustrates an embodiment of an edge generation module.

FIG. 2 illustrates an exemplary embodiment of an edge generation module 160. As previously noted, the purpose of crowd source component 161 is to gain insights into enterprise graph data based on the connections between nodes (i.e., existing edges). The combined data contributions of all nodes and edges in the graph may reveal significant and insightful results which would not be visible from an individual connection. Insights gleaned from crowd source component 161 may be representable in the enterprise graph as an edge. In an embodiment, crowd source component 161 may automatically activate and undergo process 600 described in FIG. 6 to form an edge between an actor and a node when more than a threshold number of nodes in a set of nodes associated with a first node have already formed relationships with a second node. In doing so, crowd source component 161 obtains insights from multiple edges which might not be apparent from a single edge. Edge generation module 160 may also include monitoring component 162 which is configured to monitor the actions taken by actors upon other nodes in the enterprise graph. Exemplary actions may include reading or editing a document, visiting a website, promoting some content, etc. Certain of these actions may warrant forming new edges in the enterprise graph. Relationship component 163 determines the relationship between nodes based on the actions observed by the monitoring component 162. For example, the relationship between the author of a document and the document itself may be substantially different from the relationship between a reader of the document and the document itself. Types of relationships may include creating, viewing, promoting, sharing, editing, etc. Edge privacy component 165 may ensure that newly formed edges are given an appropriate privacy setting based on the nature of the relationship. For example, if the relationship between nodes is "viewing," then any edge generated based on that relationship may be "private" (though this may change depending on organizational policies). If the relationship is "editing," then any edge generated based on that relationship may be "public" (though again, this may change depending on organizational policies). "Promoting" typically refers to an action taken to encourage others to view or interact with certain content, and is often public. "Sharing" typically refers to an action taken to cause a designated group or individual to view or interact with the content, and is typically private except to that designated group or individual. Edge privacy component 165 ensures that all new edges have the correct privacy setting. In one embodiment, the privacy setting may be a Boolean, and edge privacy component 165 may set this Boolean value to either TRUE or FALSE.

Figure 3:
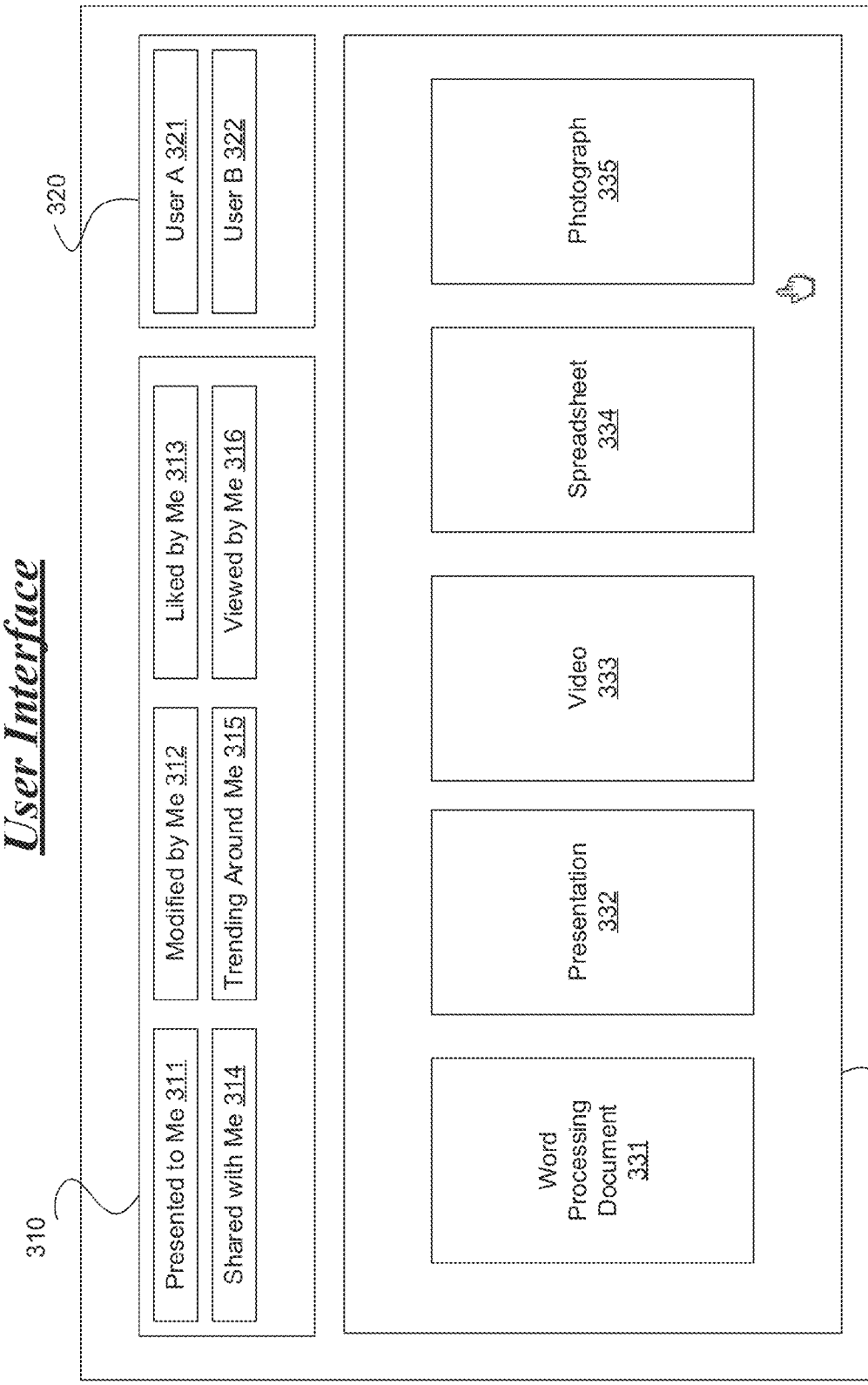
FIG. 3 illustrates an embodiment of a user interface for a user operating a client device.

FIG. 3 illustrates an exemplary UI for content interface 115-1 running on client device 110-1 to display content to user 102-1. Menu 310 may allow the user 102-1 to sort or filter different content. User 102-1 may, for example, view content which has been presented to that user, shared with that user, modified by that user, liked by that user, viewed by that user, or which is trending around that user. Content which has been presented to a user may include, for example, a presentation created with MICROSOFT® POWERPOINT®, which was displayed at a meeting that user 102-1 attended. An edge may exist between user 102-1 and this presentation because monitoring component 162 detected that user 102-1 accepted a calendar invite for a meeting at which the presentation was presented. In this example, relationship component 163 subsequently determined that the relationship or edge of "attended" exists between user 102-1 and the meeting, and a new edge was generated in accordance with process 400 shown in FIG. 4. Continuing with this example, an edge may have already existed between the presentation and the meeting, so crowd source component 161 insightfully determined that the presentation had been presented to user 102-1, and formed a new edge connecting user 102-1 with the presentation. Thus, when user 102-1 clicks on the "Presented to Me" button 311 in menu 310, the user will see the presentation. If user 102-1 clicks on the "Shared with Me" button 314, then user 102-1 may see content items shared with user 102-1. If user 102-1 clicks on the "Modified by Me" button 312, then user 102-1 may see content items edited or created by user 102-1. If user 102-1 clicks on the "Liked by Me" button 313, then user 102-1 may see content items that user 102-1 has indicated that he or she likes. If user 102-1 clicks on the "Viewed by Me" button 316, then user 102-1 may see content items that user 102-1 has previously viewed. If user 102-1 clicks on the "Trending Around Me" button 315, then user 102-1 may see content items viewed, created or edited by other users connected to user 102-1 (for example, other users in the same office, same division, or same project team). Similarly, box 320 may display nodes of users connected to user 102-1 for example, other users in the same office, same division, same project team, etc. If user 102-1 clicks on the name of a user in box 320, user 102-1 may see additional details regarding that user, for example, the user's title, connection to user 102-1, as well as content modified by or shared by that user. Content box 330 may display content determined to be most relevant to user 102-1 at the present time based on the enterprise graph. For example, content box 330 may display a word processing document 331 recently edited by user 102-1 using MICROSOFT® WORD™, a presentation 332 recently presented to user 102-1 using MICROSOFT® POWERPOINT®, a video 333 which several other users in a group of users associated with user 102-1 have viewed using WINDOWS® MEDIA PLAYER™, a MICROSOFT® EXCEL® spreadsheet 334 shared with user 102-1, and a photograph 335 which a user connected to user 102-1 has indicated that he or she likes.

FIG. 4 illustrates one embodiment of a logic flow 400. Logic flow 400 may be representative of some or all of the operations executed by one or more embodiments described herein. The operations of logic flow 400 may be executed, for example, by enterprise server 120.

In the illustrated embodiment shown in FIG. 4, logic flow 400 may receive information that a first node is forming a relationship with a second node at block 410. Logic flow 400 identifies the relationship between the first node and the second node at block 420. For example, an event may occur when a user 102-n views a document or file. A different event may occur, for example, when a user 102-n modifies a document or file. The user 102-n is referred to as a first node and the document or file that is accessed by the user is referred to as a second node. The act of viewing, modifying, etc., the document is the relationship between the nodes and the edge is defined by the relationship between the nodes, namely that the first node viewed, modified, etc. the second node.

Logic flow 400 may determine the privacy setting for the relationship between the first node and the second node at block 430. For example, when user 102-1 views a document or file, this activity is stored in the graph db 150 with the private or public Boolean value set with the generation of the edge. Logic flow 400 stores, in the graph index, identity information of the first and second nodes, the relationship therebetween and the privacy setting associated with the edge. For example, graph db 150 may be used to store relationships between nodes and edges with an associated Boolean value to indicate whether or not the edge is private or public.

Figure 5:
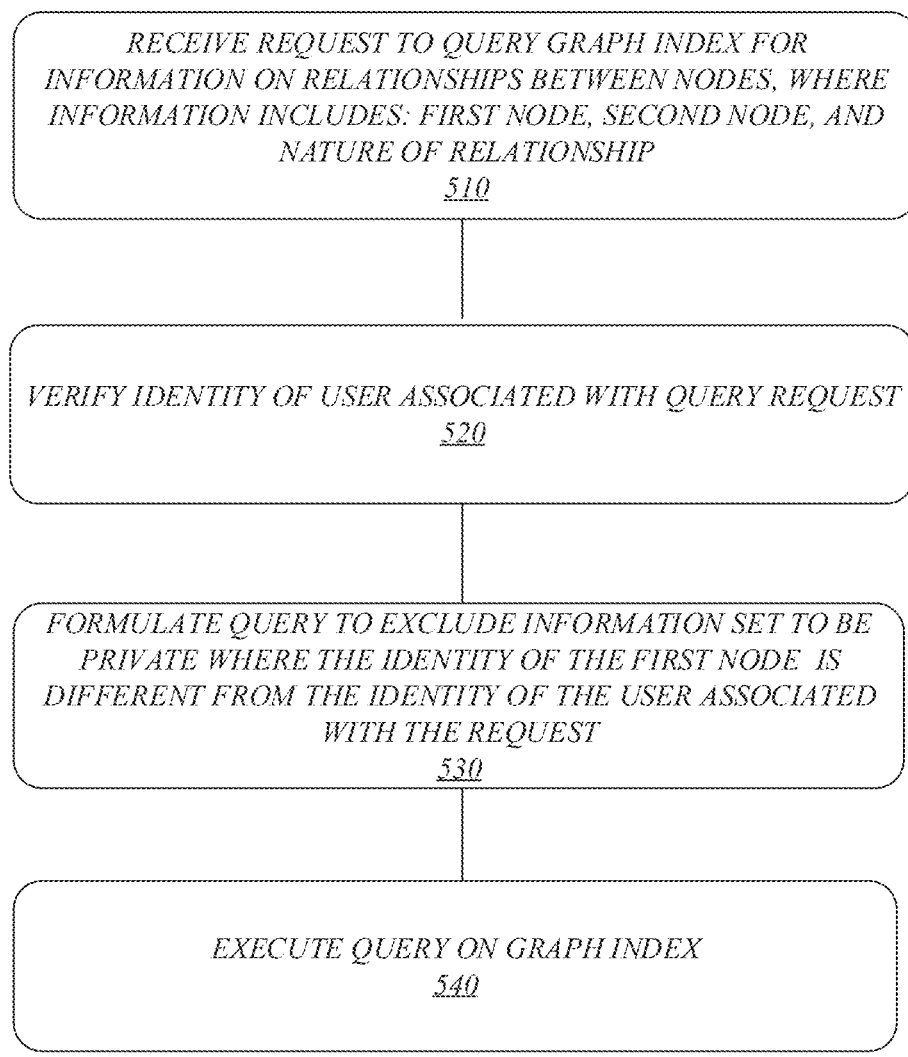
FIG. 5 illustrates an embodiment of a logic flow for querying an enterprise graph.

FIG. 5 illustrates one embodiment of a logic flow 500 which may represent some or all of the operations executed by one or more embodiments described herein. The operations of logic flow 500 may be executed, for example, by enterprise server 120.

Logic flow 500 may receive a request to query the graph index for information on relationships between nodes where information includes a first node, a second node and the nature of the relationship at block 510. Graph index component 130 is configured to receive a query from a user 102-1 . . . 102-n and process the query to obtain search results related to usage analytics associated with the requesting user. Logic flow 500 verifies the identity of the user associated with the query request at block 520. For example, graph index component 130 utilizes authentication component 135 to verify the information associated with the user requesting the query also referred to as an actor. Logic flow 500 formulates the query to exclude information set to be private where the identity of the first node is different from the identity of the user associated with the request at block 530. The logic flow executes the query at block 540.

FIG. 6 illustrates one embodiment of a logic flow 600 which may represent some or all of the operations executed by one or more embodiments described herein. The operations of logic flow 600 may be executed, for example, by enterprise server 120.

Logic flow 600 determines whether or not more than a threshold amount of nodes in a set of nodes associated with a first node have formed relationships with a second node at block 610. For example, edge generation module 160 is configured to generate new edges for an enterprise graph based on the concept of crowd sourcing" where, for example, if more than a threshold number of users in a particular set of users have associated edges, a new edge may be generated for another user within the set of users even if those edges are private. Thus, an edge may be generated for a user to enable the user to see which nodes (e.g. documents or files) are popular amongst the user's colleagues without being made aware of which specific colleagues acted with that node. Logic flow 600 determines the relationship between the first node and the second node at block 620 and stores in the graph index, information including the identity of the first node, the identity of the second node and the relationship between the first node and the second node at block 630.

FIG. 7A illustrates an exemplary enterprise graph 700-1 having a plurality of nodes 710-1 . . . 710-N and edges 720-1 . . . 720-N. Generally, nodes 710-1 . . . 710-N may represent entities, users, documents, etc., and edges 720-1 . . . 720-N represent relationships therebetween. In this example, nodes 710-1, 710-2, 710-3, and 710-4 represent users within set 745, and nodes 710-5, 710-6, and 710-N represent respective documents or files. The set 745 may represent users within the same enterprise, within the same department, part of the same user group, etc. Each node may form an edge with another node indicated by a respective arrow 720-1 . . . 720-N within graph 700-1. For example, arrow 720-1 represents an edge between node 710-1 (a user) and node 710-5 (a document) where node 710-1 viewed the document. Arrow 720-2 represents an edge between node 710-1 (a user) and node 710-6 (a document) where the user viewed the document. Similarly, arrow 720-N represents an edge between node 710-3 (a user) and node 710-6 (a document) where the user viewed the document. As illustrated in this example, node 710-4 has not formed an edge with any other node.

FIG. 7B illustrates an exemplary node table 765-1 associated with the enterprise graph 700-1 shown in FIG. 7A. Node table 765-1 includes a plurality of rows 775-1 . . . 775-N representing respective edges. Each edge is defined by a first node ID 770, a second node ID 780, a relationship ID 790, and privacy setting 795. Table 765-1 may be stored in graph database 150 on storage device 140 (shown in FIG. 1), or may be stored by any other means. Of course, alternative representations for the data in table 765-1 are also possible. When a relationship is formed between nodes, column 770 stores the identifier of the first node, column 780 stores the identifier of the second node, column 790 keeps track of the relationship, and column 795 keeps track of the privacy setting. In this case, the privacy setting is a Boolean where TRUE represents private and FALSE represents public. In this example, all of the relationships between nodes are identified as private in column 795. Row 775-1 represents edge 720-2, where node 710-1 viewed node 710-6. Row 775-2 represents edge 720-3, where node 710-2 viewed node 710-6. Row 775-3 represents edge 720-N, where node 710-3 viewed node 710-6. Row 775-4 represents edge 720-1 where node 710-1 viewed node 710-5.

FIG. 7C illustrates an exemplary enterprise graph 700-2 having a plurality of nodes 710-1 . . . 710-N and edges 720-1 . . . 720-N. Enterprise graph 700-2 illustrates the changes made to enterprise graph 700-1 by the operation of the crowd source component 161 (shown in FIG. 1) with respect to node 710-4. As noted above, nodes 710-1 . . . 710-N may represent entities, users, documents, etc., and edges 720-1 . . . 720-N represent relationships therebetween. In this example, nodes 710-1, 710-2, 710-3, and 710-4 represent users in set 745, and nodes 710-5, 710-6, and 710-N represent respective documents or files. The set 745 may represent users within the same enterprise, within the same department, part of the same user group, etc. Each node may form an edge with another node indicated by a respective arrow 720-1 . . . 720-N within graph 700-2. For example, arrow 720-1 represents an edge between node 710-1 (e.g. a user) and node 710-5 (e.g. a document) where the user "viewed" the document. Similarly, arrow 720-3 represents an edge between node 710-2 (e.g. a user) and node 710-6 (e.g. a document) where the user viewed the document. Of course, the nodes 710-1 . . . 710-N may represent various entities and edges 720-1 . . . 720-N may represent the various relationships between the nodes. As illustrated in this example, crowd source component 161 created edge 720-4 between node 710-4 and node 710-6 representing that node 710-6 will be promoted to node 710-4. The crowd source component 161 added edge 720-4 since, in this example, node 710-4 is a member of set 745 and more than a threshold number of nodes (710-1, 710-2 and 710-3) in set 745 had already formed edges with node 710-6. The crowd source component 161 added this edge even though the other edges 720-2, 720-3 . . . 720-N were private. This new edge does not disclose the specific other nodes which formed edges with node 710-6 just that the edge 720-4 was formed between nodes 710-4 and 710-6. Although this example has been described with reference to set 745, it should be understood that the creation of an edge by crowd source component 161 may be performed based on various criteria as well as various threshold values.

FIG. 7D illustrates a node table 765-2 which includes a plurality of rows 775-1 . . . 775-N representing edges. Table 765-2 illustrates the changes made to table 765-1 by the operation of crowd source component 161 with respect to row 775-5. Each edge is defined by a first node ID 770, a second node ID 780, a relationship ID 790, and privacy setting 795. Table 765-2 may be stored in graph database 150 on storage device 140, or may be stored by any other means. Of course, other representations for the data in table 765-2 are also possible. When a relationship is formed between nodes, column 770 stores the identifier of the first node, column 780 stores the identifier of the second node, column 790 keeps track of the relationship, and column 795 keeps track of the privacy setting. In this example, all of the relationships are private. Row 775-1 represents edge 720-2, where node 710-1 viewed node 710-6. Row 775-2 represents edge 720-3, where node 710-2 viewed node 710-6. Row 775-3 represents edge 720-N, where node 710-3 viewed node 710-6. Row 775-4 represents edge 720-1 where node 710-1 viewed node 710-5. Row 775-5 represents edge 720-4 where node 710-6 is promoted to node 710-4.

Figures 7E, 7F:
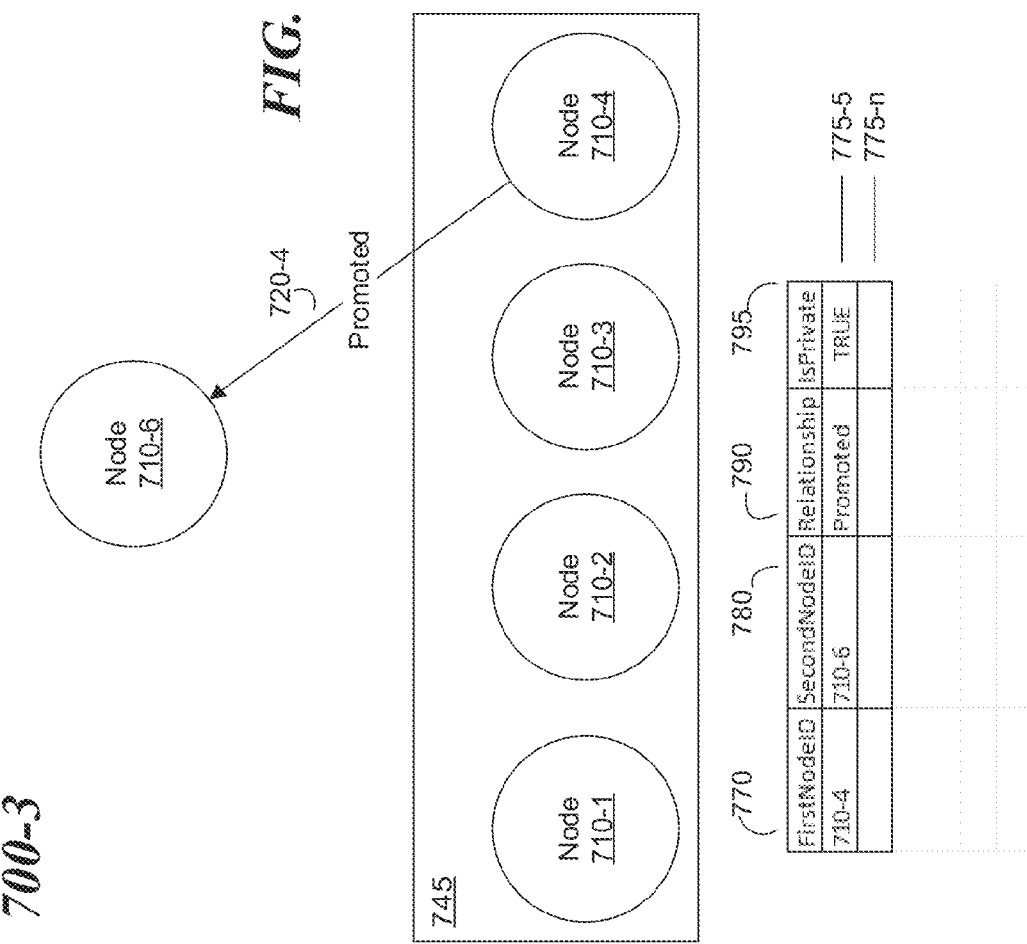
FIG. 7E illustrates an exemplary enterprise graph.
FIG. 7F illustrates an exemplary node table.

FIG. 7E illustrates an exemplary enterprise graph 700-3 which is a subset of enterprise graph 700-2. Enterprise graph 700-3 illustrates the graph that node 710-4 may access by querying. Because edges 720-1, 720-2, 720-3, and 720-N in graph 700-2 are private (have "IsPrivate" set to "TRUE" in corresponding table 765-2), a query by node 710-4 will not return these edges. Thus, privacy for nodes 710-1, 710-2, and 710-3 is maintained even though edge generation module 160 gleaned insight from the behavior of nodes 710-1, 710-2, and 710-3 via crowd source component 161 and then shared that insight with node 710-4 by generating new edge 720-4. Edge 720-4 is also private, however it originates from node 710-4, so it will be returned when node 710-4 queries graph 700-2. Consequently, node 710-4 may benefit from the insights of the crowd source component 161 (part of edge generation module 160) without interfering with the privacy of others. In this example, the query by node 710-4 does not return node 710-5 or node 710-N, because node 710-4 does not have any edges with those nodes. Node 710-4 also does not have any edges with nodes 710-1, 710-2, or 710-3, but they are nevertheless included because these nodes are all part of set 745 along with node 710-4. Of course, alternate variations are possible based on policies of what is to be kept private or public.

FIG. 7F illustrates exemplary node table 765-3 corresponding to enterprise graph 700-3. Node table 765-3 is a subset of node table 765-2 which shows the resulting node table based on a query from node 710-4. Because rows 775-1, 775-2, 775-3, and 775-4 were set to private (IsPrivate is set to TRUE for that row), they are not included as part of node table 765-3. Row 775-5 is also set to private, but it is included as part of node table 765-3 because it originates from node 710-4 (the FirstNodeID is 710-4 for that row).

FIG. 8A, FIG. 8B, FIG. 8C, and FIG. 8D illustrate another exemplary type of insight which may be gleaned from an enterprise graph. In particular, FIG. 8A illustrates exemplary enterprise graph 800-1 which consists of node 810-1, node 810-2, node 810-3, edge 820-1 and edge 820-2. In enterprise graph 800-1, edge 820-1 connects node 810-1 with node 810-2, and edge 820-2 connects node 810-3 with node 810-2. Node 810-2 may be a meeting, node 810-1 may be a presentation, for example a presentation created with MICROSOFT® POWERPOINT®. Node 810-3 may be an email address such as, for example, an email address managed by MICROSOFT® EXCHANGE™. Edge 820-1 may represent that node 810-1 was presented at node 810-2. Edge 820-2 may represent that node 810-3 was added to an attendee email list of node 810-2.

FIG. 8B illustrates accompanying node table 865-1, which corresponds to enterprise graph 800-1. Each edge is defined by a first node ID 870, a second node ID 880, a relationship ID 890, and privacy setting 895. Table 865-1 may be stored in graph database 150 on storage device 140, or may be stored by any other means. Of course, other representations for the data in table 865-1 are also possible. When a relationship is formed between nodes, column 870 stores the identifier of the first node, column 880 stores the identifier of the second node, column 890 denotes the relationship, and column 895 denotes the privacy setting. In this example, row 875-1 represents edge 820-1 connecting node 810-1 with node 810-2, and row 875-2 represents edge 820-2 connecting node 810-3 with node 810-2. In this example, all edges are set to be private since "TRUE" is denoted in each row.

FIG. 8C illustrates exemplary enterprise graph 800-2, which represents enterprise graph 800-1 with additional edge 820-3. In this example, crowd source component 161 has insightfully determined that there should be a connection between node 810-1 and node 810-3. In this case, because the email address (node 810-3) was on the attendee list of a meeting (node 810-2) at which a presentation (node 810-1) was shown, a new edge was generated (edge 820-3) connecting node 810-1 with node 810-3. Relationship component 163 determined that the relationship was "presented to." New edge 820-3 may be public or private, but this does not change the privacy setting for existing edges 820-1 and 820-2.

FIG. 8D illustrates accompanying node table 865-2, which corresponds with enterprise graph 800-2. Each edge is defined by a first node ID 870, a second node ID 880, a relationship ID 890, and privacy setting 895. Table 865-2 may be stored in graph database 150 on storage device 140, or may be stored by any other means. Of course, other representations for the data in table 865-2 are also contemplated. When a relationship is formed between nodes, column 870 stores the identifier of the first node, column 880 stores the identifier of the second node, column 890 keeps track of the relationship or edge, and column 895 keeps track of the privacy setting. In this example, row 875-1 represents edge 820-1, connecting node 810-1 with node 810-2, and row 875-2 represents edge 820-2, and connecting node 810-3 with node 810-2. Additional row 875-3 has been created which represents the new edge 820-3 connecting node 810-1 with node 810-3. In this example, all edges are set to private. The addition of new row 875-3 does not change the privacy settings in the other rows, namely row 875-1 and row 875-2.

Figure 9:
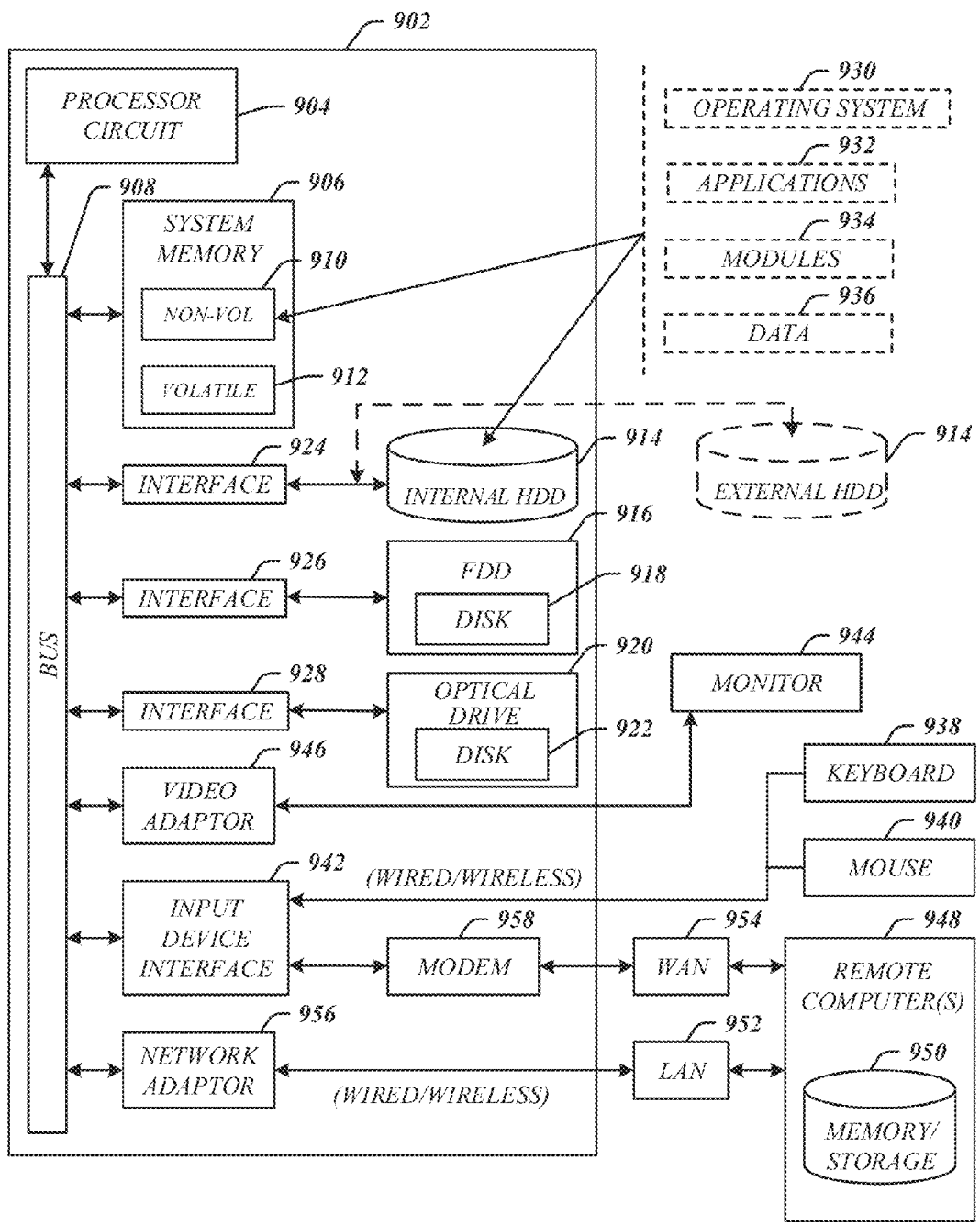
FIG. 9 illustrates an embodiment of an exemplary computing architecture suitable for implementing the system of FIG. 1.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 1, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 6, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 960 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
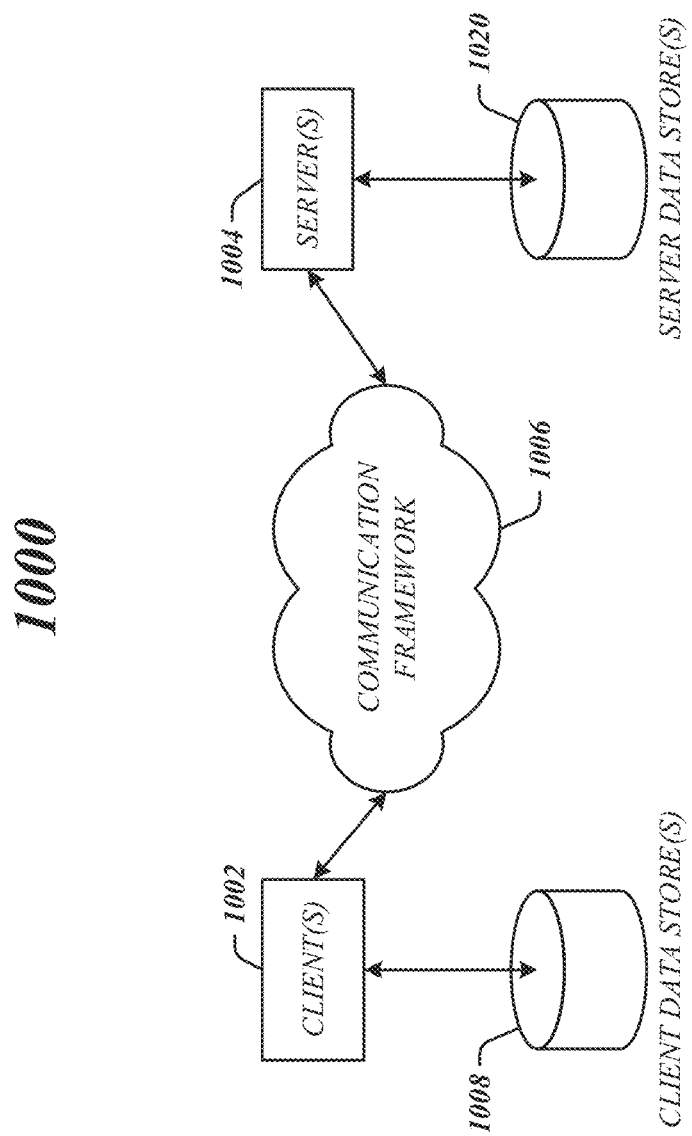
FIG. 10 illustrates a block diagram of an exemplary communications architecture suitable for implementing the system of FIG. 1.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The one or more clients 1002 may implement the client device 110-1 . . . 110-n. The servers 1004 may implement the enterprise server 120. Clients 1002 and servers 1004 are operatively connected to one or more respective client data stores 1008 and server data stores 1010 that can be employed to store information local to the respective clients 1002 and servers 1004, such as cookies and/or associated contextual information.

Clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth needed by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method being implemented in a graph index application comprising:
   determining that a first node formed a relationship with a second node based upon an activity between the first node and the second node;
   generating an edge based on the relationship between the first node and the second node;
   storing information associated with the generated edge in a graph index;
   assigning a privacy setting to the edge based on the relationship between the first node and the second node;
   storing the privacy setting in the graph index, the graph index being stored in an enterprise server; and
   communicating, to the first node or the second node, an enterprise graph that excludes information from the graph index associated with edges that have privacy settings set to true and are not associated with the first node or the second node.

2. The method of claim 1 wherein the graph index is stored in a database that is stored on the enterprise server.

3. The method of claim 1 wherein the enterprise graph is produced by including information from the graph index associated with edges that are associated with the first node or the second node.

4. The method of claim 1 wherein the relationship represents that more than a threshold number of edges exist in the graph index associated with the second node.

5. The method of claim 1 wherein the relationship represents that more than a threshold number of edges exist in the graph index associated with the second node and other nodes in a set of nodes associated with the first node.

6. The method of claim 5 wherein the edges in the graph index represent that the second node and a threshold number of nodes in a set of nodes is associated with the first node are private.

7. The method of claim 1 wherein the graph index stores relationships between actors as edges between various nodes with a value indicating a privacy setting.

8. The method of claim 1 further comprising generating a query formulated to exclude information from the enterprise graph that is set to be private where the requestor of the query is not identified as the first node.

9. An apparatus comprising:
   at least one processing circuit;
   a monitoring component operative on the at least one processing circuit to monitor activity of different nodes in an enterprise server;
   a relationship component operative on the at least one processing circuit to determine that a first node formed a relationship with a second node, generate an edge based on the relationship between the first node and the second node, and store the generated edge in a graph index;
   a privacy component operative on the at least one processing circuit to assign a privacy setting to the edge based on the relationship between the first node and the second node, store the privacy setting in the graph index; and
   an index component operative on the at least one processing circuit to, in response to a query of the graph index from a requestor, communicate query results that exclude edges from the graph index that have privacy settings set to true and are not associated with a node associated with the requestor.

10. The apparatus of claim 9 wherein the graph index is stored in a database.

11. The apparatus of claim 10 wherein the database is stored on an enterprise server.

12. The apparatus of claim 9 wherein the privacy setting is a Boolean value.

13. The apparatus of claim 9 wherein the relationship is that more than a threshold number of edges exist in the graph index associated with the second node and other nodes in a set of nodes associated with the first node.

14. The apparatus of claim 13 wherein the edges in the graph index associated with the second node and a threshold number of nodes in a set of nodes associated with the first node are private.

15. The apparatus of claim 9 wherein the index component is further operative to:
   receive a request from the requestor to generate the graph index;
   determine the identity of the requestor; and
   send to the requestor the graph index based on the identity of the requester.

16. The apparatus of claim 15 wherein the index component is further operative to:
   compare the identity of the requestor with nodes in the graph index to determine a node associated with the requestor; and
   exclude edges from the graph index that have privacy settings set to true and do not originate from the node associated with the requestor.

17. The apparatus of claim 16 wherein the index component is further operative to exclude nodes from the graph index that are not connected by edges to the node associated with the requestor.

18. The apparatus of claim 16 wherein the index component is further operative to exclude nodes from the graph index that are not connected by edges to the node associated with the requestor and are not in a set of nodes associated with the node associated with the requestor.

19. The apparatus of claim 9 wherein the index component is further operative to produce an enterprise graph associated with a requestor of the query.

20. A method being implemented in a graph index application comprising:
   monitoring activity of different nodes in an enterprise server;
   determining that a first node formed a relationship with a second node;
   generating an edge based on the relationship between the first node and the second node;
   storing the generated edge in a graph index;

assigning a privacy setting to the edge based on the relationship between the first node and the second node;
store the privacy setting in the graph index; and
communicating, in response to a query of the graph index from a requestor, an enterprise graph that excludes edges from the graph index that have privacy settings set to true and are not associated with a node associated with the requestor.

* * * * *